US006700485B2

(12) United States Patent
Kaneko et al.

(10) Patent No.: US 6,700,485 B2
(45) Date of Patent: Mar. 2, 2004

(54) ALARM NOTIFYING DEVICE

(75) Inventors: Hiromitsu Kaneko, Funabashi (JP); Koji Nonaka, Chiba (JP); Ichiro Takahashi, Inzai (JP); Seigo Kurokawa, Funabashi (JP); Kiyohiro Nakano, Funabashi (JP); Manabu Fujimoto, Narashino (JP); Yasuhiko Iwasaki, Sakura (JP); Kouji Kakuta, Narashino (JP)

(73) Assignees: Hitachi, Ltd., Tokyo (JP); Hitachi Techno Engineering Co., Ltd., Tokyo (JP); Hitachi Keiyo Engineering & Systems, Ltd., Chiba (JP)

( * ) Notice: Subject to any disclaimer, the term of this patent is extended or adjusted under 35 U.S.C. 154(b) by 190 days.

(21) Appl. No.: 09/942,781

(22) Filed: Aug. 31, 2001

(65) Prior Publication Data

US 2002/0158759 A1 Oct. 31, 2002

(30) Foreign Application Priority Data

Apr. 26, 2001 (JP) ....................................... 2001-128655

(51) Int. Cl.[7] ............................ H04Q 1/30; G08B 1/08

(52) U.S. Cl. ............. 340/531; 340/539.17; 340/539.18; 340/7.29; 340/7.52; 379/93.24; 379/37

(58) Field of Search ................................ 340/531, 539, 340/500, 501, 502, 3.1, 3.54, 7.29, 539.1, 7.56, 7.52, 539.17, 539.18; 700/17, 83; 379/37–41, 93.24

(56) References Cited

U.S. PATENT DOCUMENTS

| | | | | | |
|---|---|---|---|---|---|
| 5,917,405 | A | * | 6/1999 | Joao | 340/426 |
| 6,023,223 | A | * | 2/2000 | Baxter, Jr. | |
| 6,211,782 | B1 | * | 4/2001 | Sandelman et al. | 340/506 |
| 6,505,086 | B1 | * | 1/2003 | Dodd, Jr. et al. | 700/65 |
| 6,529,133 | B2 | * | 3/2003 | Tamaoki et al. | 340/584 |

* cited by examiner

*Primary Examiner*—Donnie L. Crosland
(74) *Attorney, Agent, or Firm*—Antonelli, Terry, Stout & Kraus, LLP

(57) ABSTRACT

An alarm notifying device comprising apparatus for inputting an alarm signal of a facility to be monitored, apparatus for connecting to a mail server for delivering an electronic mail by way of a communication line, a memory for storing a guidance text corresponding to the contents of an alarm, and a CPU having the function of transmitting an electronic mail about the alarm. In the alarm notifying device, the CPU has the function of adding the contents of an alarm and a guidance text corresponding to the alarm contents to an electronic mail.

5 Claims, 3 Drawing Sheets

FIG. 3

TITLE OF MAIL WARNING MESSAGES FROM WATER-PURIFICATION PLANT IN A CITY
GENERATION OF ALARMS : TWO
/RECOVERY OF ALARM : ONE

TEXT OF MAIL : 13:30 MARCH 30, 2001
GENERATION OF ALARM
START TIE-UP OF FEED PUMP NO. 1

13:30 MARCH 30, 2001
GENERATION OF ALARM
REDUCTION IN FEED WATER PRESSURE

13:30 MARCH 30, 2001
RECOVERY OF ALARM
HIGH WATER LEVEL OF DISTRIBUTING RESERVOIR NO. 1

GUIDANCE TO START TIE-UP OF FEED PUMP NO. 1

PERSON IN CHARGE OF PUMP SERVICE IN H CO., LTD : 03-5678-xxxx

WAYS TO COPE WITH IT : REBOOT AFTER POWER OF PUMP BOARD HAS TEMPORARILY BEEN TURNED OFF

ALARM NOTIFYING DEVICE

BACKGROUND OF THE INVENTION

1. Field of the Invention

The present invention relates to an alarm notifying device, and to a notifying device for monitoring and recording operating conditions of a water supply/delivery system for water supply and drainage, an industrial manufacturing facility, a sales data collecting facility, etc., displaying and recording a failure in each facility and its abnormal condition, detecting an alarm signal and thereby notifying an alarm to a person or the like in charge of facility maintenance, who is kept out of a monitoring room.

2. Description of the Related Art

It has heretofore been known that an alarm notifying device for monitoring and notifying operating conditions or the like of each facility has been installed. Further, the transmission of an alarm in the form of an electronic mail has been proposed. In a device for notifying an alarm by use of a conventional electronic mail, the name of the alarm and the time of the generated alarm have merely been transmitted as an electronic mail. Therefore, when an alarm mail is received outside a monitoring room, time and efforts required to inquire about a way or method of coping with a contact address of a person in charge of maintenance and an alarm have been spent, and thereby mobility (that information is available whenever and wherever) of an electronic mail could not be utilized effectively so as to cope with an urgent alarm. There might be cases in which when a mail indicative of only the contents of an alarm was received, a person in charge of maintenance, who maintained a plurality of facilities at a time, could not determine from the received warning mail from which facility it was issued. There might also be cases where when a plurality of alarms occurred simultaneously, all the contents of alarms could not be acquired from the restriction of the capacity of reception of a cellular telephone.

SUMMARY OF THE INVENTION

The present invention has been made to solve the conventional problems. Therefore, the present invention aims to provide an alarm notifying device wherein a person in charge of maintenance having received a warning mail on the road is capable of providing instructions for recovering a facility, and a maintenance server taking charge of maintenance of a plurality of facilities is able to carry out subsequent treatments from information about the received warning mail.

The present invention provides an alarm notifying device comprising means for inputting an alarm signal of a facility to be monitored, means for connecting to a mail server for delivering an electronic mail by way of a communication line, a memory for storing a guidance text corresponding to the contents of an alarm, and a CPU having the function of transmitting an electronic mail about an alarm, wherein the CPU has the function of adding the contents of an alarm and a guidance text corresponding to the alarm contents to an electronic mail.

BRIEF DESCRIPTION OF THE DRAWINGS

FIG. 3 is a diagram for describing one example of the contents of a mail with a guidance text, which is employed in the embodiment.

DETAILED DESCRIPTION OF THE INVENTION

A preferred embodiment of the present invention will be described.

Figure 1:
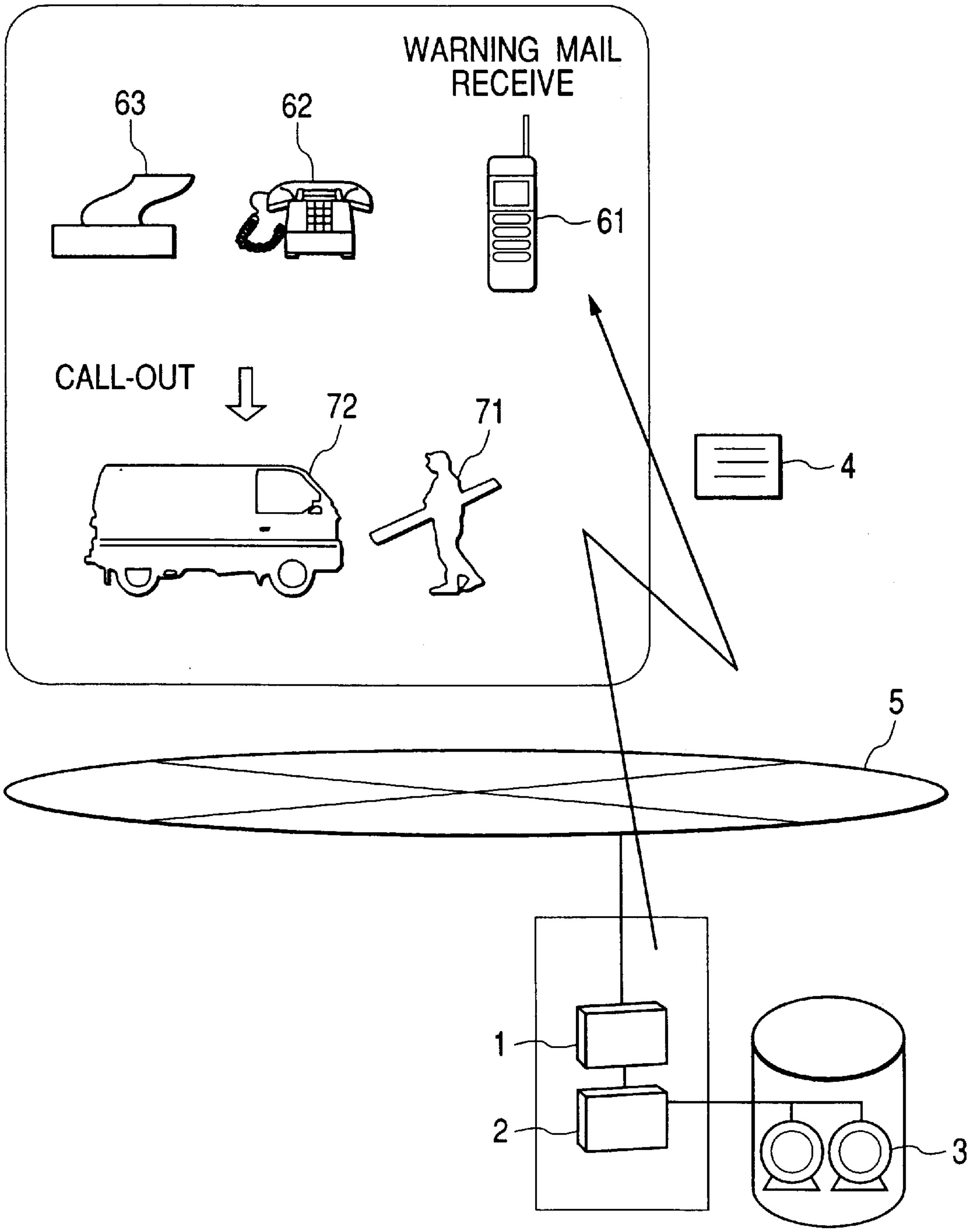
FIG. 1 is a diagram for describing an alarm notifying device according to an embodiment.
Figure 2:
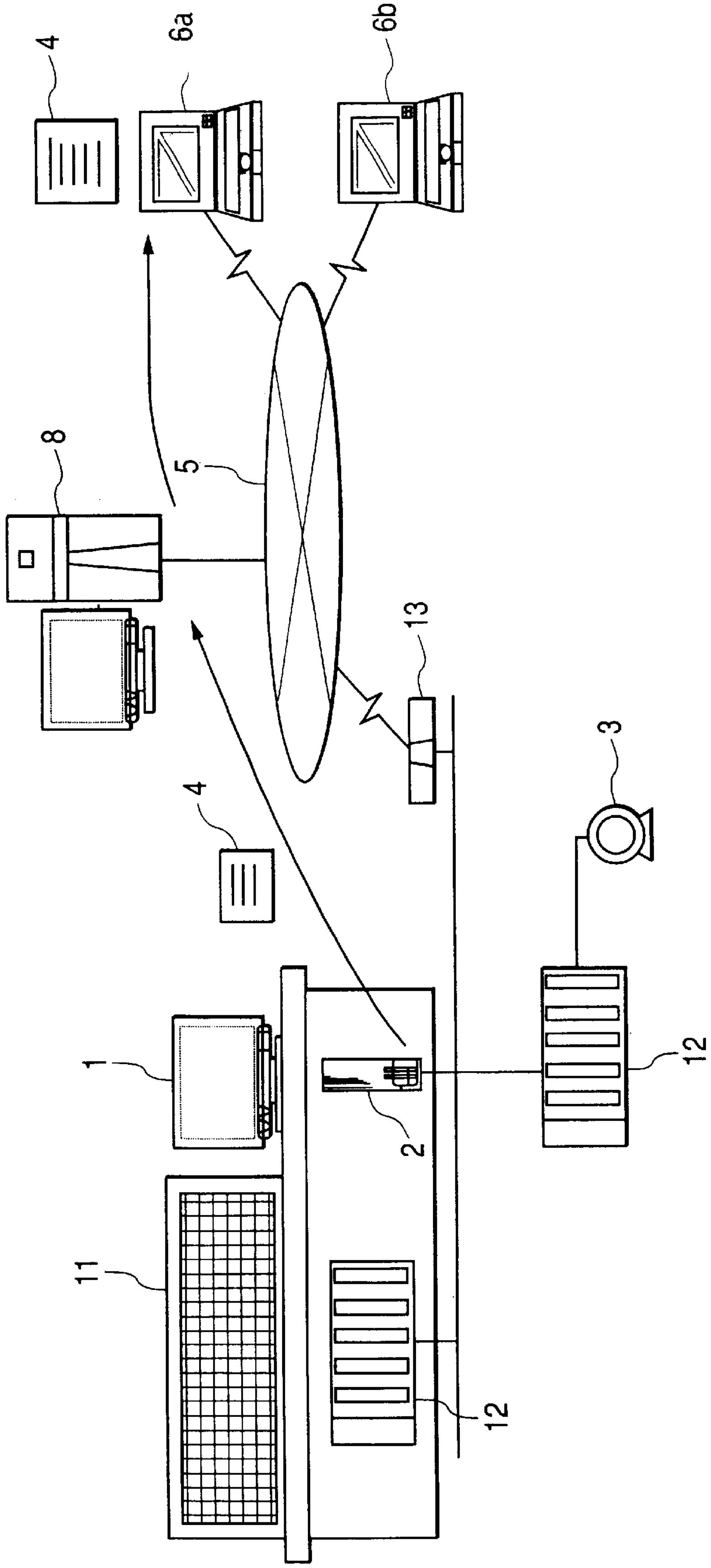
FIG. 2 is a diagram for describing a mail transmitting function with a guidance text, which is employed in the embodiment.

An embodiment illustrating an alarm notifying device of the present invention will be explained using FIGS. 1 through 3. FIG. 1 is a diagram for describing the alarm notifying device of the present invention. FIG. 2 is a diagram for describing a mail transmitting function with a guidance text, which is employed in the embodiment. FIG. 3 is a diagram for describing one example of the contents of a mail with a guidance text, which is employed in the embodiment.

An embodiment 1 will be described. As shown in FIG. 1, an alarm notifying device 1 according to the present embodiment is installed in a monitoring room of a facility to be monitored such as a manhole pump or the like together with a sequencer 2 or the like. Further, the alarm notifying device 1 is connected to the sequencer 2 for taking in or capturing a signal indicative of the operation of each of manhole pumps 3 or the like corresponding to facilities to be monitored, a signal indicative of a failure therein, etc. The alarm notifying device 1 transmits a message 4 of a mail with a guidance to a cellular phone 61, a telephone 62, a facsimile 63, etc. via a communication line 5 or the like. A person 71 in charge of service or the like, who has received it, is called out to the facilities 3 by a vehicle 72 or the like in response to the message 4 of the main with the guidance. Thus, when the person 71 or the like receives a warning message, the person 71 goes into action right away in preparation for the corresponding facility and is capable of making repairs or the like on trouble or the like.

The alarm notifying device 1 according to the embodiment 1 comprises, for example, a personal computer or the like and includes means for inputting an alarm signal of a facility to be monitored, means for making a connection to a mail server for delivering an electronic mail via the communication line 5, a memory for storing a guidance text corresponding to the contents of an alarm, and a CPU having the function of transmitting an electronic mail about an alarm. The CPU of the alarm notifying device 1 has the function of adding the contents of the alarm and the guidance text corresponding to the contents thereof to the electronic mail. Further, the alarm notifying device 1 is provided with a memory for storing therein a telephone number added to the guidance text, and a method text corresponding to the alarm.

The mail transmitting function with the guidance text, of the alarm notifying device 1 according to the embodiment 1 will be explained using FIG. 2. The sequencer 2, which has taken in or captured a failure signal sent via a telemeter 12 from the corresponding facility 3 to be monitored, outputs an alarm signal to the alarm notifying device 1 installed in a central monitoring room together with a mini graphics panel 11 or the like. The alarm notifying device 1 having received the alarm signal therein sends a guidance-added mail 4 for predetermined client devices or units 6*a* and 6*b* to a mail server 8 via a dial up router 13 and a communication line 5 or the like. A mail receiver obtains access to the mail server 8 to confirm the presence or absence of the self-addressed mail sent from the corresponding client device 6, whereby the mail receiver is able to receive the mail 4 with the guidance text sent from the alarm notifying device 1. Since the guidance text is attached to the received mail 4, the mail receiver is capable of obtaining the contents of a faulty facility and its failure, a telephone number of a person in charge of maintenance, a text indicative of a way or method of coping with the failure, etc. Thus the mail receiver is capable of executing adapting subsequent to the reception of an alarm without impairing mobility of the mail.

Incidentally, in the embodiment 1, the alarm notifying device is provided with the memory for storing the guidance text corresponding to the contents of the alarm, the telephone number and the text indicative of the method or way of coping with the alarm. Further, the CPU has the function of adding the contents of the alarm and the guidance text corresponding to the contents of the alarm, etc. to the electronic mail. However, the alarm notifying device may be provided with a memory for storing facility information for specifying a facility to be monitored or a memory for storing the number of alarms which have occurred in facilities to be monitored. Further, the CPU may be configured so as to have the function of adding the corresponding facility information and the number of occurrences of the alarms to the title of an electronic mail about the alarms.

One example of a guidance text employed in the present embodiment is shown in FIG. 3. As guidance texts, may be mentioned, an alarm-issued facility, the number of occurrences of alarms, the number of recoveries of alarms, the contents of each alarm, the contents of alarm recovery, a telephone number of a maintenance contact address, a method of coping with each alarm, etc.

According to the present invention, an alarm notifying device can be obtained wherein a person in charge of maintenance having received a warning mail on the road is capable of providing instructions for recovering a facility, and a maintenance server taking charge of maintenance of a plurality of facilities is able to carry out subsequent treatments from information about the received warning mail.

What is claimed is:

1. An alarm notifying device comprising:

means for inputting an alarm signal of a facility to be monitored;

means for connecting to a mail server for delivering an electronic mail by way of a communication line;

a memory for storing a guidance text, which includes a telephone number of a maintenance contact address and a method of coping with each alarm, corresponding to the contents of an alarm; and a CPU having a function of transmitting an electronic mail about an alarm, wherein the CPU has a function of adding the contents of an alarm and a guidance text corresponding to the alarm contents to an electronic mail.

2. The alarm notifying device according to claim 1, further including a memory for storing said telephone number added to the guidance text.

3. The alarm notifying device according to claim 1, further including a memory for storing said text indicative of a way of coping with an alarm added to the guidance text.

4. An alarm notifying device comprising:

means for inputting an alarm signal of a facility to be monitored;

means for connecting to a mail server for delivering an electronic mail by way of a communication line;

a memory for storing facility information for specifying a facility to be monitored; and a CPU having the function of transmitting an electronic mail about an alarm, wherein the CPU has the function of adding corresponding facility information to the title of the electronic mail about the alarm.

5. An alarm notifying device comprising:

means for inputting an alarm signal of a facility to be monitored;

means for connecting to a mail server for delivering an electronic mail by way of a communication line;

a memory for storing the number of alarms developed in facilities to be monitored; and a CPU having the function of transmitting an electronic mail about an alarm, wherein the CPU has the function of adding the number of occurrences of the corresponding alarms to the title of the electronic mail about the alarm.

* * * * *